(12) United States Patent
Kouzuma

(10) Patent No.: US 9,043,082 B2
(45) Date of Patent: May 26, 2015

(54) POWER SUPPLY CONTROL DEVICE FOR ELECTRIC ACTUATORS FOR DOOR-RELATED ACCESSORIES IN VEHICLE

(75) Inventor: Hiroyuki Kouzuma, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 65 days.

(21) Appl. No.: 13/641,727

(22) PCT Filed: Apr. 15, 2011

(86) PCT No.: PCT/JP2011/059361
§ 371 (c)(1),
(2), (4) Date: Oct. 17, 2012

(87) PCT Pub. No.: WO2011/148732
PCT Pub. Date: Dec. 1, 2011

(65) Prior Publication Data
US 2013/0041555 A1 Feb. 14, 2013

(30) Foreign Application Priority Data
May 28, 2010 (JP) ................................. 2010-122903

(51) Int. Cl.
*G06F 7/00* (2006.01)
*E05B 77/12* (2014.01)
(Continued)

(52) U.S. Cl.
CPC .............. *E05B 77/12* (2013.01); *B60R 21/013* (2013.01); *B60R 2021/01252* (2013.01); *B60R 21/0136* (2013.01); *E05B 81/86* (2013.01)

(58) Field of Classification Search
CPC .............. B60R 21/013; B60R 21/0136; B60R 2021/01252; E05B 81/86; E05B 77/12; E05B 2047/0058
USPC ........................................................... 701/36
See application file for complete search history.

(56) References Cited

U.S. PATENT DOCUMENTS 5,836,639 A * 11/1998 Kleefeldt et al. ............. 296/155
6,914,346 B2 7/2005 Girard
(Continued)

FOREIGN PATENT DOCUMENTS

| CN | 1591248 A | 3/2005 |
| CN | 1752390 A | 3/2006 |

(Continued)

OTHER PUBLICATIONS

Official communication dated Mar. 24, 2014 issued in the corresponding Chinese Patent Application 201180026292.0.

*Primary Examiner* — Calvin Cheung
*Assistant Examiner* — Paula L Schneider
(74) *Attorney, Agent, or Firm* — Carrier Blackman & Associates, P.C.; Joseph P. Carrier; Jeffrey T. Gedeon

(57) ABSTRACT

In a vehicle in which a power distributor is provided between a plurality of electric actuators for door-related accessories and an auxiliary power source connected to a main power source, the electric actuators including an electric actuator for a door lock device provided on a door lock device, control unit for controlling the power distributor operates so that, when a voltage applied from the main power source to the auxiliary power source is reduced to a predetermined voltage or below, and an impact detection sensor detects an impact that is a predetermined value or greater, a door lock device is put into an unlocked state while maintaining the supply of power from the auxiliary power source to the electric actuator for a door lock device, but the supply of power from the auxiliary power source to the remaining electric actuators for door-related accessories is forcibly stopped.

3 Claims, 3 Drawing Sheets

(51) Int. Cl.
*B60R 21/013* (2006.01)
*B60R 21/0136* (2006.01)
*E05B 81/86* (2014.01)
*B60R 21/01* (2006.01)

(56) References Cited

U.S. PATENT DOCUMENTS 7,245,200 B2  7/2007  Inoguchi
7,443,287 B2  10/2008  Kawamura et al.
7,529,602 B2  5/2009  Nagata et al.
2002/0177931 A1* 11/2002  Iwasaki et al. ............... 701/36

FOREIGN PATENT DOCUMENTS

| CN | 1757866 A | 4/2006 |
| EP | 1 130 202 A1 | 9/2001 |
| JP | 7-269208 A | 10/1995 |

* cited by examiner

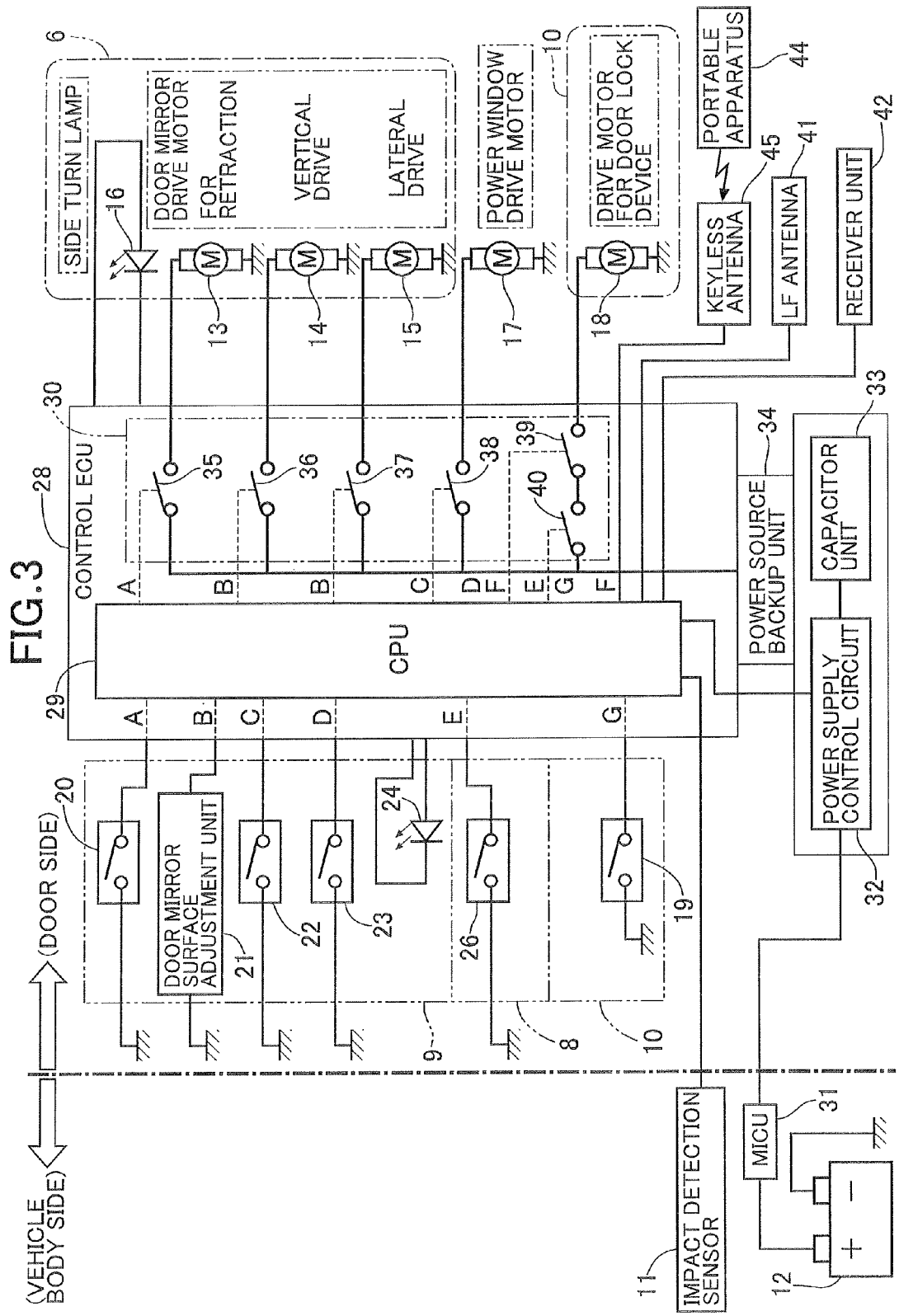

POWER SUPPLY CONTROL DEVICE FOR ELECTRIC ACTUATORS FOR DOOR-RELATED ACCESSORIES IN VEHICLE

TECHNICAL FIELD

The present invention relates to a vehicle in which a plurality of electric actuators for door-related accessories, including an electric actuator for a door lock device provided on the door lock device to operate the door lock device so as to put a door into an openable state according to an open instruction operation in an unlocked state that has been attained according to on a lock release instruction operation in a state in which power is supplied, and an auxiliary power source connected to a main power source, are disposed on a door, and a power distributor that can switch over the supply/cut-off of power from the auxiliary power source to the plurality of electric actuators for door-related accessories is provided between the auxiliary power source and the plurality of electric actuators for door-related accessories, and in particular to an improvement of a power supply control device for electric actuators for door-related accessories.

BACKGROUND ART

An arrangement in which a door lock device is equipped with a door lock motor that operates so as to switch from a locked state to an unlocked state, control means for controlling the door lock motor is provided with energy storage means equipped with a capacitor for temporarily storing power from a battery in order to release the door locked state even when a power source or its circuit is destroyed by a collision, etc., when collision detection means detects a collision the door locked state is first set by power supplied from the energy storage means, and after a predetermined time has elapsed thereafter the door locked state is released, is already known from Patent Document 1.

RELATED ART DOCUMENTS

Patent Documents

Patent Document 1: Japanese Patent Application Laid-open No. 7-269208

SUMMARY OF THE INVENTION

Problems to be Solved by the Invention

However, in the arrangement disclosed by Patent Document 1, since the door locked state is released by detecting an impact suffered by a vehicle body, there is a possibility that the door locked state will be released by any impact that is suffered, and the theft resistance is therefore poor.

The present invention has been accomplished in light of such circumstances, and it is an object thereof to provide a power supply control device for electric actuators for door-related accessories that has enhanced theft resistance while enabling a door locked state to be released even when a power source or its circuit is destroyed by a collision, etc.

Means for Solving the Problems

In order to attain the above object, according to an aspect of the present invention, there is provided a power supply control device for electric actuators for door-related accessories in a vehicle in which a plurality of electric actuators for door-related accessories, including an electric actuator for a door lock device provided on the door lock device to operate the door lock device so as to put a door into an openable state according to an open instruction operation in an unlocked state that has been attained according to a lock release instruction operation in a state in which power is supplied, and an auxiliary power source connected to a main power source, are disposed on the door, and a power distributor that can switch over the supply/cut-off of power from the auxiliary power source to the plurality of electric actuators for door-related accessories is provided between the auxiliary power source and the plurality of electric actuators for door-related accessories, the power supply control device comprising: an impact detection sensor for detecting an impact; voltage reduction detection means for detecting a reduced voltage state in which a voltage applied from the main power source to the auxiliary power source is reduced to a predetermined voltage or below; and control means for controlling the power distributor so that, when the voltage reduction detection means detects the reduced voltage state and the impact detection sensor detects an impact that is a predetermined value or greater, the door lock device is put into an unlocked state while maintaining the supply of power from the auxiliary power source to, among the electric actuators for door-related accessories, the electric actuator for a door lock device, but the supply of power from the auxiliary power source to the remaining electric actuators for door-related accessories is forcibly stopped.

A front left door 5 of an embodiment corresponds to the door of the present invention, a battery 12 of the embodiment corresponds to the main power source of the present invention, a door mirror drive motor 13 for retraction, a door mirror drive motor 14 for vertical drive, a door mirror drive motor 15 for lateral drive, and a power window drive motor 17 of the embodiment correspond to the electric actuators for door-related accessories of the present invention, a drive motor 18 for a door lock device of the embodiment corresponds to the electric actuator for a door lock device of the present invention, a CPU 29 of the embodiment corresponds to the voltage reduction detection means and the control means of the present invention, and a capacitor unit 33 of the embodiment corresponds to the auxiliary power source of the present invention.

Effects of the Invention

In accordance with the above-mentioned aspect of the present invention, when the voltage applied from the main power source to the auxiliary power source reaches a predetermined voltage or below and the vehicle body suffers an impact of a predetermined value or greater, since the supply of power from the auxiliary power source to the electric actuators for door-related accessories other than the electric actuator for a door lock device is forcibly stopped, and the door lock device is put into an unlocked state and the supply of power from the auxiliary power source to the electric actuator for a door lock device is maintained, when the vehicle body suffers an impact of a predetermined value or greater due to a collision, etc. of the vehicle and the supply of power from the main power source to the auxiliary power source is cut off due to a cable being damaged, etc., the electric actuator for a door lock device is operated according to an open instruction operation and the door can be put into an openable state. Moreover, since the door lock device does not attain an unlocked state by detection of an impact or a reduction of the voltage applied from the main power source to the auxiliary power source on their own, it is possible to prevent a malfunction and enhance the theft resistance. Furthermore, in a state in which the supply of power from the main power source to the auxiliary power source is insufficient, power required by the electric actuator for a door lock device is ensured by stopping the supply of power from the auxiliary power source to the electric actuators for door-related accessories other than the electric actuator for a door lock device, thus enabling the electric actuator for a door lock device to be operated reliably.

BRIEF DESCRIPTION OF DRAWINGS

FIG. 3 is a block diagram, corresponding to FIG. 2, of a second embodiment. (second embodiment)

EXPLANATION OF REFERENCE NUMERALS AND SYMBOLS

Figure 1:
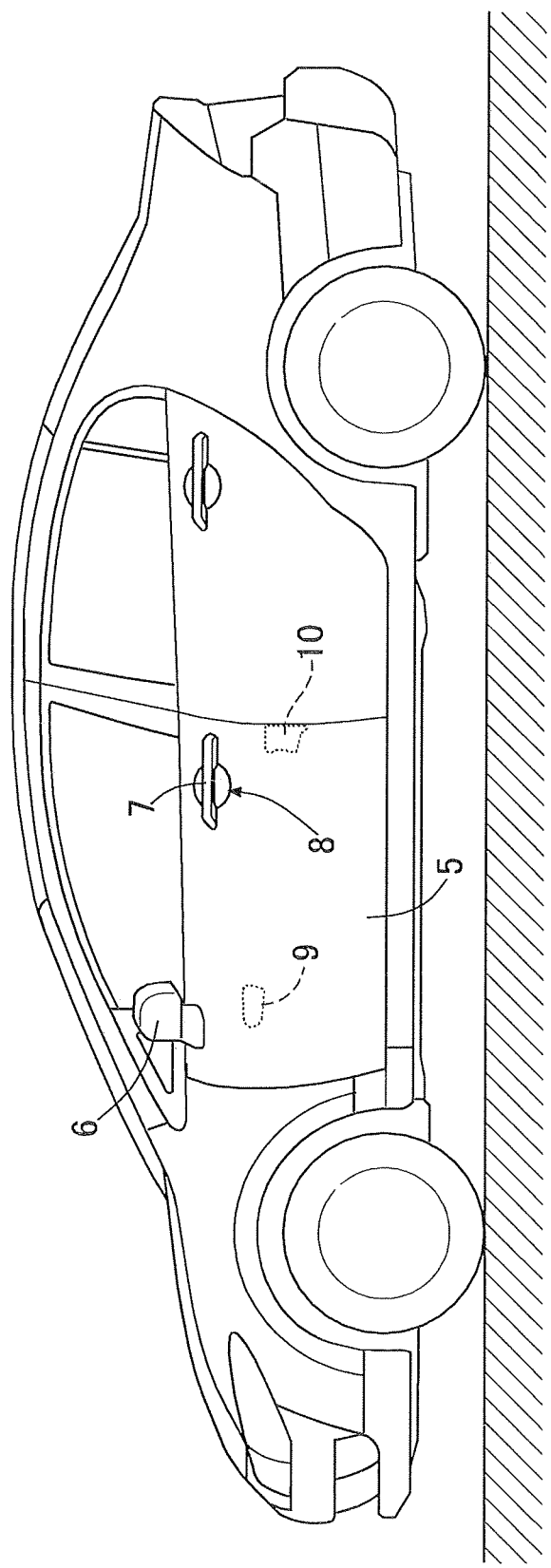
FIG. 1 is a left side view of a passenger vehicle of a first embodiment. (first embodiment)

5 Front left door, which is a door
10 Door lock device
11 Impact detection sensor
12 Battery, which is a main power source
13 Door mirror drive motor for retraction, which is an electric actuator for door-related accessories
14 Door mirror drive motor for vertical drive, which is an electric actuator for door-related accessories
15 Door mirror drive motor for lateral drive, which is an electric actuator for door-related accessories
17 Power window drive motor, which is an electric actuator for door-related accessories
18 Drive motor for a door lock device, which is an electric actuator for a door lock device
29 CPU serving as both voltage reduction detection means and control means
30 Power distributor
33 Capacitor unit, which is an auxiliary power source Modes For Carrying Out The Invention Modes for carrying out the present invention are explained below by reference to the attached drawings.

Embodiment 1

A first embodiment of the present invention is explained by reference to FIG. 1 and FIG. 2; first, in FIG. 1, this passenger vehicle is a left-hand drive vehicle; a door mirror 6 and an outer handle unit 8 having an outer handle 7 are disposed on an outer face side of a front left door 5 disposed on the left-hand side of a vehicle driver, and an inner handle unit 9 that can be operated by the vehicle driver within a passenger compartment is disposed on an inner face side of the front left door 5. Furthermore, provided on the front left door 5 is a door lock device 10 that can switch between a locked state and an unlocked state of the door 5.

Figure 2:
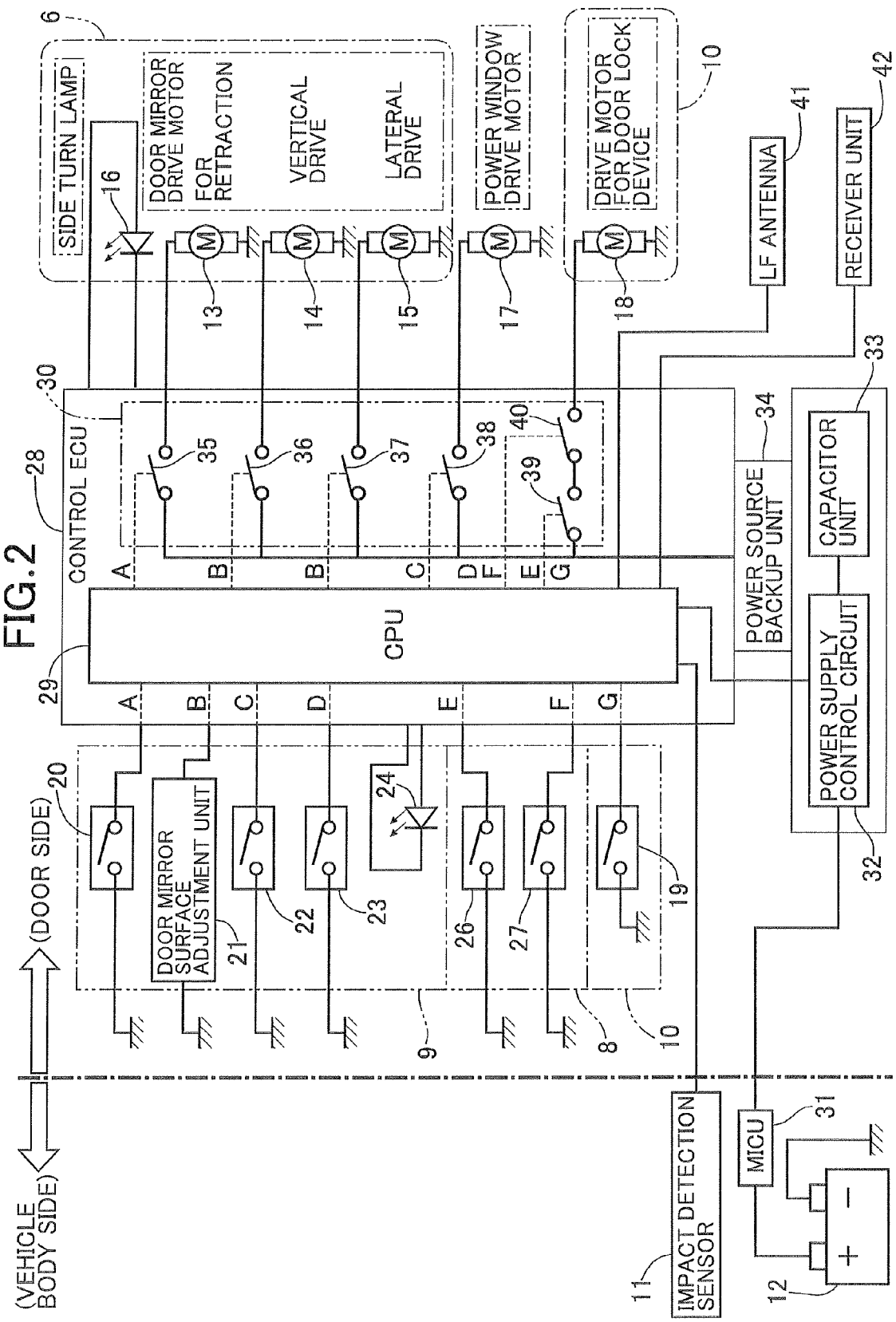
FIG. 2 is a block diagram showing a power supply control device for electric actuators for door-related accessories. (first embodiment)

In FIG. 2, mounted on the vehicle body side are an impact detection sensor 11 for detecting an impact and a battery 12, which is a main power source.

Furthermore, the door mirror 6 has built in a door mirror drive motor 13 for refraction, a door mirror drive motor 14 for vertical drive, and a door mirror drive motor 15 for lateral drive and is provided with a side turn lamp 16 that turns ON when the vehicle turns left. The front left door 5 has built in a power window drive motor 17. The door lock device 10 has built in a drive motor 18 for a door lock device and an inner handle operation detection switch 19, the drive motor 18 for a door lock device being an electric actuator for a door lock device that operates the door lock device 10 so as to put the front left door 5 into an openable state according to an open instruction operation in an unlocked state that has been attained according to a lock release instruction operation in a state in which power is supplied.

That is, the front left door 5 is provided with the door mirror drive motor 13 for retraction, the door mirror drive motor 14 for vertical drive, the door mirror drive motor 15 for lateral drive, the power window drive motor 17, and the drive motor 18 for a door lock device, which are a plurality of electric actuators for door-related accessories.

Furthermore, the inner handle unit 9 includes a door mirror-retracting switch 20 for instructing retraction of the door mirror 6 thus operating the door mirror drive motor 13 for retraction, a door mirror surface adjustment unit 21 for instructing adjustment of the mirror surface of the door mirror 6 thus operating the door mirror drive motor 14 for vertical drive and the door mirror drive motor 15 for lateral drive, a power window switch 22 for instructing raising/lowering of the window glass thus operating the power window drive motor 17, an inner side lock/unlock changeover switch 23 for instructing switching of the door lock device 10 from a locked state to an unlocked state, and a locked state display LED 24 that turns ON when the door lock device 10 is in a locked state.

Furthermore, disposed on the outer handle 7 of the outer handle unit 8 are an open switch 26 (or an open sensor) for giving an instruction to open so as to put the front left door 5 into an openable state when the door lock device 10 is in an unlocked state, and an outer side lock/unlock changeover switch 27 for instructing switching of a locked state of the door lock device 10 into an unlocked state.

Furthermore, the inner handle unit 9 has an inner handle (not illustrated) that can be operated by the vehicle driver within the passenger compartment in order to give an instruction to open so as to put the front left door 5 into an openable state when the door lock device 10 is in an unlocked state; when the inner handle is operated its operating force is transmitted to the interior of the door lock device 10 via a cable, which is not illustrated, and the inner handle operation detection switch 19, which is built into the door lock device 10, is put into an ON state.

A control ECU 28 is provided within the front left door 5, the control ECU 28 controlling the operation of the door minor drive motor 13 for retraction, the door minor drive motor 14 for vertical drive, the door mirror drive motor 15 for lateral drive, the power window drive motor 17, and the drive motor 18 for a door lock device, this control ECU 28 including a CPU 29, which is control means (also referred to as a control unit), and a power distributor 30 controlled by the CPU 29.

The control ECU 28 is equipped with a capacitor unit 33, which is an auxiliary power source connected to the battery 12 via an MICU (Multiplex Integrated Control Unit) 31 and a power supply control circuit 32, and the capacitor unit 33 is connected to the power distributor 30 via a power source backup unit 34.

Signals from the door mirror-retracting switch 20, the door mirror surface adjustment unit 21, the power window switch 22, the inner side lock/unlock changeover switch 23, the open switch 26, the outer side lock/unlock changeover switch 27, and the inner handle operation detection switch 19 are inputted into the CPU 29 as shown by reference symbols A to G in FIG. 2, and the CPU 29 controls the power distributor 30 according to the signals input from the door mirror-retracting switch 20, the door mirror surface adjustment unit 21, the power window switch 22, the inner side lock/unlock changeover switch 23, the open switch 26, the outer side lock/unlock changeover switch 27, and the inner handle operation detection switch 19.

The power distributor 30 includes a first switch 35 disposed between the power source backup unit 34 and the door mirror drive motor 13 for refraction, a second switch 36 disposed between the power source backup unit 34 and the door mirror drive motor 14 for vertical drive, a third switch 37 between the power source backup unit 34 and the door mirror drive motor 15 for lateral drive, a fourth switch 38 disposed between the power source backup unit 34 and the power window drive motor 17, and fifth and sixth switches 39 and 40 connected in series and disposed between the power source backup unit 34 and the drive motor 18 for a door lock device, ON/OFF switching of the first to sixth switches 35 to 40 being controlled by the CPU 29.

Reference symbols A to G, which are displayed in FIG. 2 in relation to the first to sixth switches 35 to 40, correspond to the reference symbols A to G given to signals inputted into the CPU 29 from the door mirror-retracting switch 20, the door mirror surface adjustment unit 21, the power window switch 22, the inner side lock/unlock changeover switch 23, the outer side lock/unlock changeover switch 27, the open switch 26, and the inner handle operation detection switch 19; when the door mirror-retracting switch 20 is ON the CPU 29 puts the first switch 35 into an ON state, the CPU 29 controls the ON state of the second and third switches 36 and 37 according to the input of signal B from the door mirror surface adjustment unit 21, when the power window switch 22 is ON the CPU 29 puts the fourth switch 38 into an ON state, when the inner side lock/unlock changeover switch 23 is ON the CPU 29 puts the sixth switch 40 into an ON state, when the open switch 26 is ON the CPU 29 puts the fifth switch 39 into an ON state, when the outer side lock/unlock changeover switch 27 is ON the CPU 29 puts the sixth switch 40 into an ON state, and the CPU 29 puts the fifth switch 39 into an ON state according to the signal input from the inner handle operation detection switch 19.

Furthermore, connected to the CPU 29 are an LF antenna 41 and a receiver unit 42 used for transmission of an ID signal to and from a portable apparatus, which is not illustrated.

Moreover, mounted on the vehicle body side is the impact detection sensor 11 for detecting an impact suffered by the vehicle body, a signal from the impact detection sensor 11 being inputted into the CPU 29. Furthermore, the CPU 29 also has a function as voltage reduction detection means (also referred to as a voltage reduction detection unit) for detecting a reduced voltage state in which the voltage applied from the battery 12 to the capacitor unit 33 has reduced to a predetermined voltage or below, and when it is determined that there is a reduced voltage state, in which the voltage applied from the battery 12 to the capacitor unit 33 has reduced to a predetermined voltage or below, and the impact detection sensor 11 has detected an impact of a predetermined value or greater, the CPU 29 controls the power distributor 30 so that the door lock device 10 is put into an unlocked state while, among the door mirror drive motor 13 for retraction, the door mirror drive motor 14 for vertical drive, the door mirror drive motor 15 for lateral drive, the power window drive motor 17, and the drive motor 18 for a door lock device, the supply of power from the capacitor unit 33 to the drive motor 18 for a door lock device is maintained, and the supply of power from the capacitor unit 33 to the remainder, that is, the door minor drive motor 13 for retraction, the door minor drive motor 14 for vertical drive, the door minor drive motor 15 for lateral drive, and the power window drive motor 17, is forcibly stopped.

That is, when there is a reduced voltage state, in which the voltage applied from the battery 12 to the capacitor unit 33 has reduced to a predetermined voltage or below, and the impact detection sensor 11 has detected an impact of a predetermined value or greater, the CPU 29 puts the first to fourth switches 35 to 38 into an OFF state, thereby forcibly stopping the supply of power from the capacitor unit 33 to the door mirror drive motor 13 for retraction, the door mirror drive motor 14 for vertical drive, the door mirror drive motor 15 for lateral drive, and the power window drive motor 17, and puts the sixth switch 40 into an ON state. This puts the door lock device 10 into an unlocked state, the supply of power from the capacitor unit 33 to the drive motor 18 for a door lock device is maintained, and operating the drive motor 18 for a door lock device according to the open switch 26 or the inner handle operation detection switch 19 being ON enables the front left door 5 to be put into an openable state.

Shifting from a locked state to an unlocked state when there is a reduced voltage state, in which the voltage applied from the battery 12 to the capacitor unit 33 has reduced to a predetermined voltage or below, and the impact detection sensor 11 has detected an impact of a predetermined value or greater is carried out after a predetermined time (e.g. 30 sec) has elapsed after the requirements are fulfilled, and by so doing it is possible to prevent the locked state from shifting to the unlocked state without a vehicle that has been involved in a collision, etc. stopping traveling.

Furthermore, when there is a reduced voltage state, in which the voltage applied from the battery 12 to the capacitor unit 33 has reduced to a predetermined voltage or below, but the impact detection sensor 11 has not detected an impact of a predetermined value or greater, the CPU 29 controls the ON/OFF switching of the fifth and sixth switches 39 and 40 connected to the drive motor 18 for a door lock device according to a change in switching mode of the open switch 26, the inner handle operation detection switch 19, the inner side lock/unlock changeover switch 23, and the outer side lock/unlock changeover switch 27 but forcibly puts all of the first to fourth switches 35 to 38 into an OFF state.

Moreover, in a state in which the impact detection sensor 11 has detected an impact of a predetermined value or greater but the voltage applied from the battery 12 to the capacitor unit 33 has not become a predetermined voltage or below, the CPU 29 does not impose any restriction on the ON/OFF switching of the first to sixth switches 35 to 40.

The operation of this first embodiment is now explained: when the voltage applied from the battery 12 to the capacitor unit 33 reaches a predetermined voltage or below and the vehicle body suffers an impact of a predetermined value or greater, the supply of power from the capacitor unit 33 to the electric actuators for door-related accessories other than the drive motor 18 for a door lock device, that is, the door mirror drive motor 13 for retraction, the door mirror drive motor 14 for vertical drive, the door mirror drive motor 15 for lateral drive, and the power window drive motor 17, is forcibly stopped, the door lock device 10 is put into an unlocked state, and the supply of power from the capacitor unit 33 to the drive motor 18 for a door lock device is maintained, and it is therefore possible to operate the drive motor 18 for a door lock device according to an open instruction operation by the open switch 26 or an open instruction operation by the inner handle when the supply of power from the battery 12 to the capacitor unit 33 is cut off due to damage to a cable, etc. as a result of the vehicle body suffering an impact of a predetermined value or greater due to a collision, etc. of the vehicle, thereby putting the front left door 5 into an openable state.

Moreover, since the door lock device 10 is not put into an unlocked state by detection of an impact or reduction of the voltage applied from the battery 12 to the capacitor unit 33 on their own, it is possible to prevent a malfunction, thus enhancing the theft resistance.

Furthermore, in a state in which the supply of power from the battery 12 to the capacitor unit 33 is insufficient, the power required by the drive motor 18 for a door lock device is ensured by stopping the supply of power from the capacitor unit 33 to the door mirror drive motor 13 for retraction, the door mirror drive motor 14 for vertical drive, the door mirror drive motor 15 for lateral drive, and the power window drive motor 17, which are the electric actuators for door-related accessories other than the drive motor 18 for a door lock device, thereby enabling the drive motor 18 for a door lock device to be operated reliably.

Embodiment 2

A second embodiment of the present invention is explained by reference to FIG. 3; parts corresponding to those of the first embodiment are only illustrated with the same reference numerals and symbols, and a detailed explanation is omitted.

Disposed on an outer handle 7 of an outer handle unit 8 is an open switch 26 (or an open sensor) for giving an open instruction so as to put a front left door 5 into an openable state when a door lock device 10 is in an unlocked state, the outer side lock/unlock changeover switch 27 of the first embodiment not being provided. Instead of this outer side lock/unlock changeover switch, a keyless antenna 45 receiving a signal outputted via wireless communication from a portable apparatus 44 according to operation of a lock/unlock changeover switch of the portable apparatus 44 is provided on the front left door 5, and a signal from this keyless antenna 45 is inputted into a CPU 29.

In accordance with this second embodiment also, the same effects as those of the first embodiment are exhibited.

Modes for carrying out the present invention are explained above, but the present invention is not limited to the above-mentioned embodiments and may be modified in a variety of ways as long as the modifications do not depart from the spirit and scope thereof.

The invention claimed is:

1. A power supply control device for electric actuators for door-related accessories in a vehicle in which a plurality of electric actuators for door-related accessories, including an electric actuator for a door lock device provided on the door lock device to operate the doorlock device so as to put a door into an openable state according to an open instruction operation in an unlocked state that has been attained according to a lock release instruction operation in a state in which power is supplied, and an auxiliary power source connected to a main power source are disposed on the door, and a power distributor that can switch over the supply/cut-off of power from the auxiliary power source to the plurality of electric actuators for door-related accessories is provided between the auxiliary power source and the plurality of electric actuators for door-related accessories, the power supply control device comprising:
an impact detection sensor for detecting an impact;
a voltage reduction detection unit for detecting a reduced voltage state in which a voltage applied from the main power source to the auxiliary power source is reduced to a predetermined voltage or below; and
a control unit for controlling the power distributor configured to:
detect the reduced voltage state from the voltage reduction detection unit;
detect an impact from the impact detection sensor that is a predetermined value or greater;
determine an amount of time that has elapsed since the detection of the reduced voltage state from the voltage reduction detection unit;
set the door lock device to an unlocked state while maintaining the supply of power from the auxiliary power source to the electric actuator for a door lock device when detecting both that the impact that is the predetermined value or greater and that the amount of time that has elapsed since the detection of the reduced voltage state is a predetermined amount of time; and
disable the supply of power from the auxiliary power source to the remaining electric actuators for door-related accessories when detecting both that the impact that is the predetermined value or greater and that the amount of time that has elapsed since the detection of the reduced voltage state is a predetermined amount of time.

2. A power supply control device for electric actuators for door-related accessories in a vehicle in which a plurality of electric actuators for door-related accessories, including an electric actuator for a door lock device provided on the door lock device to operate the door lock device so as to put a door into an openable state according to an open instruction operation in an unlocked state that has been attained according to a lock release instruction operation in a state in which power is supplied, and an auxiliary power source connected to a main power source, are disposed on the door, and a power distributor that can switch over the supply/cut-off of power from the auxiliary power source to the plurality of electric actuators for door-related accessories is provided between the auxiliary power source and the plurality of electric actuators for door-related accessories, the power supply control device comprising:
an impact detection sensor configured to detect an impact;
a processing unit configured to control the power distributor by:
detecting a reduced voltage state in which a voltage applied from the main power source to the auxiliary power source is reduced to a predetermined voltage or below;
detecting an impact from the impact detection sensor that is a predetermined value or greater;
determining an amount of time that has elapsed since the detection of the reduced voltage state;
setting the door lock device to an unlocked state while maintaining the supply of power from the auxiliary power source to the electric actuator for a door lock device when detecting both that the impact that is the predetermined value or greater and that the amount of time that has elapsed since the detection of the reduced voltage state is a predetermined amount of time; and
disabling the supply of power from the auxiliary power source to the remaining electric actuators for door-related accessories when detecting both that the impact that is the predetermined value or greater and that the amount of time that has elapsed since the detection of the reduced voltage state is a predetermined amount of time.

3. A method for controlling a power supply for electric actuators for door-related accessories in a vehicle in which a plurality of electric actuators for door-related accessories, including an electric actuator for a door lock device provided on the door lock device to operate the door lock device so as to put a door into an openable state according to an open instruction operation in an unlocked state that has been attained according to a lock release instruction operation in a state in which power is supplied, and an auxiliary power source connected to a main power source, are disposed on the door, and a power distributor that can switch over the supply/cut-off of power from the auxiliary power source to the plurality of electric actuators for door-related accessories is provided between the auxiliary power source and the plurality of electric actuators for door-related accessories, the power supply control device having an impact detection sensor configured to detect an impact, and a processing unit configured to control the power distributor, the method comprising:

detecting a reduced voltage state in which a voltage applied from the main power source to the auxiliary power source is reduced to a predetermined voltage or below;

detecting an impact from the impact detection sensor that is a predetermined value or greater;

determining an amount of time that has elapsed since the detection of the reduced voltage state;

setting the door lock device to an unlocked state while maintaining the supply of power from the auxiliary power source to the electric actuator for a door lock device when detecting both that the impact that is the predetermined value or greater and that the amount of time that has elapsed since the detection of the reduced voltage state is a predetermined amount of time; and disabling the supply of power from the auxiliary power source to the remaining electric actuators for door-related accessories when detecting both that the impact that is the predetermined value or greater and that the amount of time that has elapsed since the detection of the reduced voltage state is a predetermined amount of time.

* * * * *